3,137,669
POLYOXYMETHYLENE RESINS MODIFIED WITH GLYCERINE TO IMPROVE IMPACT STRENGTH
Chester Griswold Bragaw, Jr., West Chester, Pa., assignor to E. I. du Pont de Nemours and Company, Wilmington, Del., a corporation of Delaware
No Drawing. Filed July 29, 1960, Ser. No. 46,103
3 Claims. (Cl. 260—33.4)

This invention relates to a polyoxymethylene resin, and, more particularly, to polyoxymethylene resins modified with glycerin.

In U.S. Patent 2,768,994 issued to R. N. MacDonald on October 30, 1956, there is described normally solid, tough, thermally stable polyoxymethylene. Because of the unique combination of stiffness, toughness and inertness possessed by this polymer, it has been widespread use in molded and extruded objects. For some applications, however, it is desirable to employ a resin having greater impact strength than the unmodified resin. A typical example of such an application is a molded bottle. When such a container is filled with liquid and dropped, the container is subjected to high tensile stress. Materials having high tensile-impact strengths show good resistance to cracking under such circumstances. Similarly, in certain extruded objects such as pipe, and tubing, resistance to impact cracking from external blows is very desirable.

It is an object of this invention to provide a polyoxymethylene resin composition having improved impact strength. Other objects will appear hereinafter.

The objects of this invention are accomplished by the composition which comprises high molecular weight polyoxymethylene having incorporated therein 1 to 20% by weight of glycerin based upon the combined weight of said glycerin and said polyoxymethylene. In accordance with the present invention it was discovered that glycerin is unique in improving the impact strength of polyoxymethylene resins. Other compounds, including many other polyhydric alcohols, were found ineffective in improving the impact strength of polyoxymethylene.

The amount of glycerin employed is not critical, but the best results are obtained at levels of 1 to 20% by weight, based on the total combined weight of glycerin and polyoxymethylene. Below about 1%, little improvement in the impact strength is obtained. At levels above about 20%, other properties of the resin are adversely affected, such as tensile strength and stiffness. For general purposes, glycerin levels of 3 to 10% by weight based upon the combined weight of said glycerin and said polyoxymethylene are preferred.

If desired, the resin may optionally contain amounts of fibers, pigments, fillers and the like.

The term "polyoxymethylene," whenever used in this description and in the appended claims, is intended to be synonymous with an addition polymer of formaldehyde in which the polymer chain exclusive of the terminal portioons of the chain, is a repeating series of carbon-to-oxygen, or, to be more precise, methylene-to-oxygen, linkages formed by recurring —($CH_2O$)— structural units. The polyoxymethylene resins will vary slightly in properties depending on the end groups; however, with respect to this invention, the chain structure rather than the terminal groups of the chain determines the action of the glycerin on the polymer. Thus, polyoxymethylene dicarboxylate, polyoxymethylene glycol, and polyoxymethylene diether are all intended to be encompassed within the term "polyoxymethylene." "High molecular weight polyoxymethylene" as used herein means those polyoxymethylenes having a number average molecular weight greater than 10,000. Polyoxymethylene diacetates may be prepared by the processes described in Belgian Patent 557,796 granted June 15, 1957. Polyoxymethylene diethers may be prepared by the processes described in Belgian Patent 570,884 granted March 2, 1959.

In order to more fully illustrate various embodiments of the present invention, the following examples are included. Unless otherwise indicated, all parts and percentages are by weight.

EXAMPLE 1

Polyoxymethylene resin having an inherent viscosity of 1.04 as measured in phenol, corresponding to a number average molecular weight of about 40,000, was extruded with various amounts of glycerin. Injection molded bars from the mixture having a cross-section of 1/16-inch square were subjected to tensile impact tests by the method described in Modern Plastics, vol. 33, #10, June 1956, page 199. At glycerin levels of 3½%, 7% and 10% by weight, based on the total combined weight of glycerin and polyoxymethylene, the tensile impact strengths were 94, 108, and 112 ft.-lb./in.$^3$ respectively, compared to 72 ft.-lb./in.$^3$ for the unmodified resin.

EXAMPLE 2

In contrast to the substantial improvement obtained in Example 1, a number of other compounds were mixed with the polyoxymethylene resin of Example 1, extruded, injection molded, and tested as in Example 1. The results of these tests are shown in Table I.

Table I

| Compound | Amount (percent by weight) | Tensile impact (ft.-lb./in.$^3$) |
|---|---|---|
| Methyl-alpha-glucoside | 15 | 59 |
| 2-ethyl-1-hexanol | 2 | 40 |
| Octadecanol | 4 | 54 |
| 1-tetradecanol | 4 | 40 |
| Nonyl alcohol | 8 | 26 |
| Cyclohexanol | 8 | 52 |
| Cetyl alcohol | 2 | 49 |
| Dibutyl phthalate | 8 | 25 |
| Pentaerythritol | 10 | 20 |
| Sorbitol | 10 | 28 |
| Ethylene glycol | 20 | 36 |

These results show the unique ability of glycerin to improve the impact strength of high molecular weight polyoxymethylene.

EXAMPLE 3

The following examples illustrate other improved properties of the polyoxymethylene resin-glycerin compositions. Using the polyoxymethylene resin of Example 1, a mixture containing 8% of glycerin, by weight, based on the total combined weight of glycerin and polyoxymethylene, was prepared and extruded into 0.138 in. O.D. tubing having .025 in. walls. A sample of the tubing was folded, unfolded, and refolded in the opposite direction. This process was repeated more than 40 times before the tubing cracked. Repeating a similar procedure for unmodified polyoxymethylene resin, the tubing cracked after only 14 folds.

EXAMPLE 4

The composition described in Example 3 was molded into a strip 1/16-in. x ½-in. x 6-in. This specimen was mounted as in a Charpy Impact test and struck with a standard Izod hammer. There was required 2.40 ft.-lb. to fracture the sample. A test strip of unmodified resin required only 0.72 ft.-lb. to fracture the test sample.

It should be understood that the foregoing examples are intended as mere illustrations of the invention and are not to be construed as limitations thereof.

The preferred method of obtaining the compositions of the present invention is by adding glycerin to polymer in finely divided form and extruding or milling this mixture to form a homogeneous blend. Other methods of preparing the compositions of the present invention will be obvious to those skilled in the art.

The composition of this invention is particularly desirable for the fabrication of shaped articles such as filaments, films, sheets, fibers, bristles, pipes, rods, and tubes.

I claim:

1. The composition which comprises polyoxymethylene having a number average molecular weight greater than 10,000 and having incorporated therein 1 to 20% by weight of glycerin based upon the combined weight of said glycerin and said polyoxymethylene.

2. The composition which comprises polyoxymethylene having a number average molecular weight greater than 10,000 and having incorporated therein 3 to 10% by weight of glycerin based upon the combined weight of said glycerin and said polyoxymethylene.

3. A shaped article having the composition of claim 1.

References Cited in the file of this patent

UNITED STATES PATENTS

| | | |
|---|---|---|
| 2,121,844 | Weisenburg | June 28, 1938 |
| 2,247,764 | Nevin | July 1, 1941 |
| 2,296,249 | Austin et al. | Sept. 22, 1942 |
| 2,399,456 | Yates et al. | Apr. 30, 1946 |
| 3,020,264 | Behrends et al. | Feb. 6, 1962 |

FOREIGN PATENTS

| | | |
|---|---|---|
| 753,299 | Great Britain | July 18, 1956 |